UNITED STATES PATENT OFFICE.

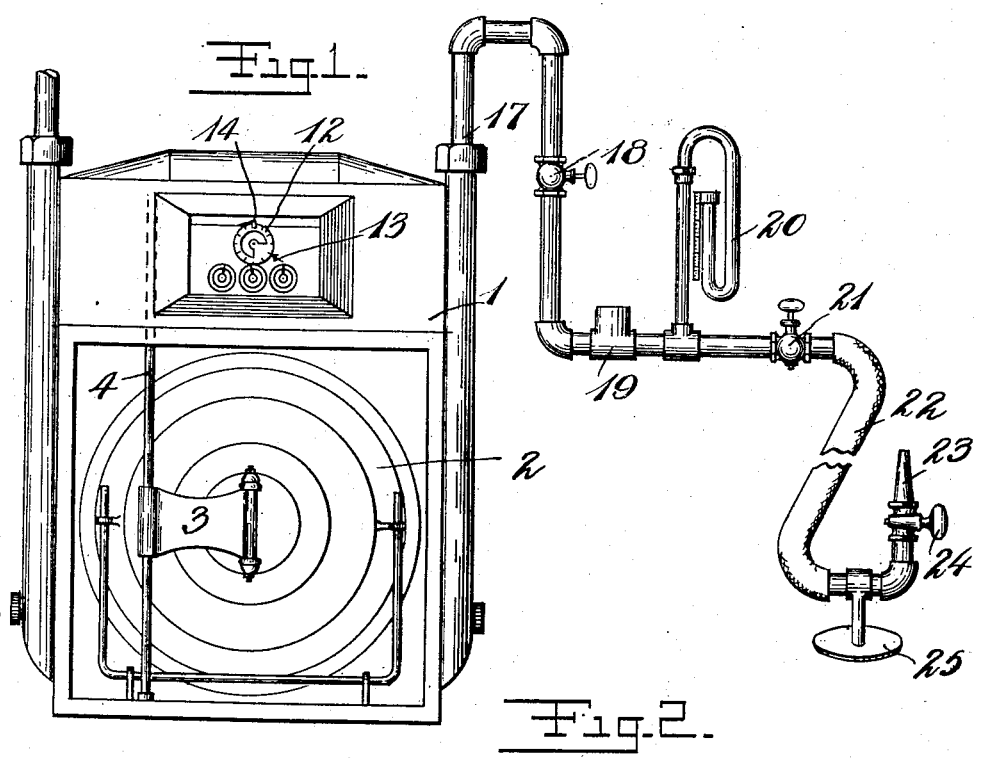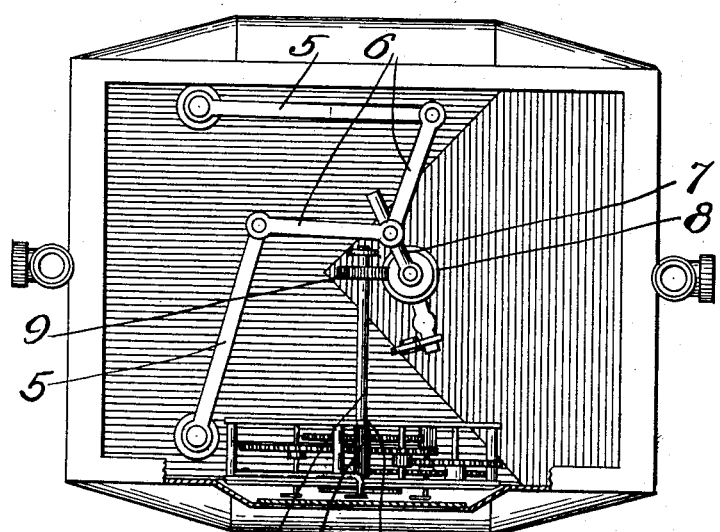

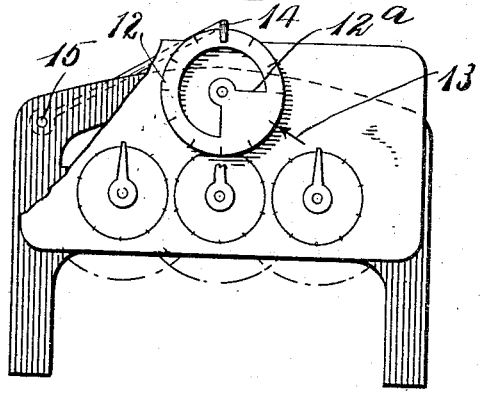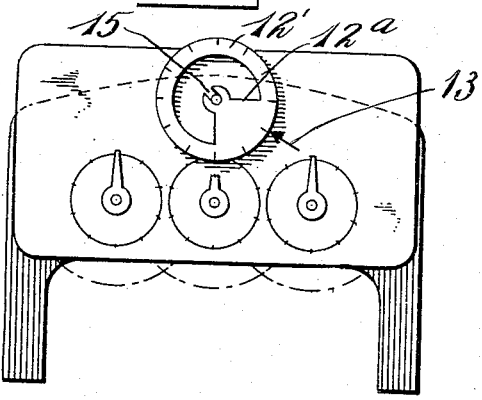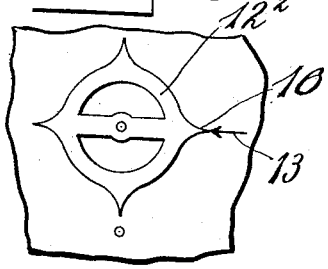

RICHARD LEE DEZENDORF, OF RICHMOND HILL, NEW YORK.

MEANS FOR TESTING METERS.

1,198,425.  Specification of Letters Patent.  Patented Sept. 19, 1916.

Application filed February 15, 1916. Serial No. 78,348.

*To all whom it may concern:*

Be it known that I, RICHARD L. DEZENDORF, a citizen of the United States, residing at Richmond Hill, Queens county, New York, have invented certain new and useful Improvements in Means for Testing Meters, of which the following is a full, clear, and exact description.

My invention relates to improvements in means for testing meters and has for its object to provide means for testing a meter *in situ*, and consists of certain improvements in meters and also in means for passing a definite quantity of gas through the meter at a definite pressure during a given period of time.

The following is a description of an embodiment of my invention, reference being had to the accompanying drawings, in which—

Figure 1 shows a meter supplied with my improvements, the front cover of the meter being removed. Fig. 2 is a plan view of the meter with the top cover removed and a portion of the front wall broken away. Fig. 3 is a front elevation of the improved dial with portions broken away. Fig. 4 is a front elevation of the dial showing a modified arrangement. Fig. 5 shows a modification of the dial index forming a part of my invention. Fig. 6 shows another modification of the dial index.

Referring more particularly to the drawings, 1 is the ordinary meter casing containing the diaphragm 2, flag 3, flag wires 4, upper flag arms 5 and lower flag arms 6 connected to the tangent 7, which is connected to the worm 8 driving the worm wheel 9 which operates the index shaft 10, all of the ordinary construction and operating in the ordinary manner. The index shaft 10 is, as usual, connected at 10′ somewhat loosely to the index pinion 11 and there is some back lash between the worm 8 and its gear.

In place of the pointer which is ordinarily carried by the index pinion 11, I provide in my invention a flat graduated disk or plate 12 and place upon the face of the dial a marker 13 consisting of a line or arrow drawn on the dial plate. The disk 12 is provided with graduations which are so spaced that the distance between two graduations corresponds to one revolution of the tangent or multiples thereof. This is the important feature in connection with my invention.

In the form shown in Fig. 1 the distance between two adjacent graduations on the disk 12 corresponds to a single revolution of the tangent. The disk 12 revolves counterclockwise and as shown in Fig. 1 is unbalanced, the side containing the sector $12^a$ being the heavier. The marker 13 is so located that the center of gravity of the disk 12, when it is positioned on the same side of its axis as the marker 13, is rising when the meter is in operation. The result of this is that when the center of gravity is passing the marker 13, the index disk is being positively driven by the worm, all lost motion between the worm 8 and the index dial 12 having been taken up. In order to further assure the positive drive of the disk I provide a brake or drag 14 consisting of a metal rod pivoted loosely at 15 on the frame of the dial. The upper end of this drag rests upon the upper edge of the disk and assists in assuring the positive drive of the disk. The drag and the location of the center of gravity of the disk coöperate at certain times to assure the positive drive above referred to.

In Fig. 4 the drag is omitted and the disk 12′ is made with a notch 15 such that when the end of the pinion shaft is fully seated in the notch, the disk is properly centered, whereupon it is secured with solder. With this arrangement the disk can be applied to old meters without removing the ordinary hand heretofore carried by the pinion shaft.

If the index disk is accurately balanced, the action of the meter will be to continuously drive the disk without any jumping and such an accurately balanced disk is shown at $12^2$ in Fig. 5. This disk is also provided with long radial points 16 which are made narrow enough not to seriously obscure portions of the dial lying beyond the body of the disk. These points constitute calibrations and in the form shown are located so that the distance between two points corresponds exactly to three revolutions of the tangent on the ordinary five light meter. The long points upon the disk increase accuracy of the readings.

The disks in all instances are located close to the dial face, and inasmuch as the calibrations thereon pass a stationary index, it is easy to make an accurate reading by watching a single stationary point, more so than it is to follow around a pointer which changes its position relatively to the point of observation.

Fig. 6 shows another form of unbalanced calibrated member 12³, the same being a quadrant disk provided with four calibrations which are spaced apart so that the spaces between two adjacent calibrations correspond exactly to one revolution of the tangent.

In order to test a meter provided with my improved dial I provide an attachment consisting of a coupling member 17 which has a stop cock 18, a pressure regulator 19, a pressure indicator 20, a second stop cock 21 located beyond the pressure indicator, a flexible tubing 22, and a standardized burner 23 provided with a cock 24 and mounted upon a stand 25. This standardized burner I preferably make so as to permit the passage of four cubic feet of gas per hour. In testing a meter such as above described, I remove the house connection from the outlet of the meter and apply thereto the coupling 17 with its connected parts. I then adjust the cock 18 so that in conjunction with the pressure regulator 19 the proper pressure is indicated on the pressure indicator 20. I preferably make that pressure correspond to 1½″ water pressure. I then open the cocks 21 and 24 and light the gas which escapes from the burner 23. I then wait until one of the calibrations upon the disk 12 is exactly opposite the marker 13 and then with a watch observe how long it takes to have the fourth calibration mark reach the marker 13. If it takes more than the time which should properly be required I know that the meter is running slow; if less I know that the meter is running fast. With the unbalanced type of disk 12 I preferably begin my readings at a time when the center of gravity of the disk is rising. With the balanced type shown in Fig. 5 that is not necessary. With the type shown in Fig. 5, in which the points are separate so as to correspond to three normal revolutions of the tangent, if the time required for the successive alinement of two adjacent calibration points is less than the time which should be required I know that the meter is running fast and if a greater time is required I know that the meter is running slow.

With the means above described, a meter can be tested *in situ* with sufficient accuracy for various purposes and its operative condition determined. Being tested on a small load its defects, if any, are observable and leakage of the valves, if any, can be readily determined. In order to determine whether the valves leak at any point it is necessary to have the tangent revolve one or more complete revolutions and it is preferable to have the tangent revolve a plurality of revolutions and necessary to know exactly how many complete revolutions it has revolved and the time elapsed.

As will be evident to those skilled in the art, my invention permits of various modifications without departing from the spirit thereof or the scope of the appended claims.

What I claim is—

1. In a meter having a tangent, the combination of a worm having a vertical axis, a gear actuated thereby, the axis of said gear lying in a horizontal plane, a shaft connected to said gear, an indicator having a graduated sector calibrated for revolutions of said tangent and driven by said shaft, said indicator lying in the vertical plane, there being lost motion between said indicator and said worm, and a stationary marker adjacent to the calibrations on said indicator.

2. In a meter, the combination of a worm having a vertical axis, a gear actuated thereby, the axis of said gear lying in a horizontal plane, a shaft connected to said gear, an indicator having a graduated sector calibrated for revolutions of said worm and driven by said shaft, said indicator lying in a vertical plane, there being lost motion between said indicator and said worm, a stationary marker, said indicator having its center of gravity out of alinement with its axis of rotation, and said marker being located at the side of said indicator of which said center of gravity lies when moving upward.

3. In a meter, the combination of a worm having a vertical axis, a gear actuated thereby, the axis of said gear lying in a horizontal plane, a shaft connected to said gear, an indicator having a graduated sector calibrated for revolutions of said worm and driven by said shaft, said indicator lying in a vertical plane, there being lost motion between said indicator and said worm, a stationary marker, said indicator having its center of gravity out of alinement with its axis of rotation, said worm acting to drive said indicator in a counterclockwise direction, and said marker being located at the right hand side of said indicator.

4. In a meter, the combination of a worm having a vertical axis, a gear rotated thereby about a horizontal axis, a shaft connected to said gear, a circular graduated indicator carried by said shaft and lying in a vertical plane, a stationary marker and a drag for said indicator.

5. In a meter, the combination of a worm having a vertical axis, a gear rotated thereby about a horizontal axis, a shaft connected to said gear, a circular graduated indicator carried by said shaft and lying in a vertical plane, a stationary marker and a drag for said indicator, said indicator having its center of gravity out of alinement with its axis of rotation, and said marker being located on the side of said indicator in which said center of gravity lies when moved upward.

6. The combination in a meter having a tangent, of a worm having a vertical axis, a gear actuated thereby, the axis of said gear lying in a horizontal plane, a shaft connected to said gear, an indicator having a graduated sector calibrated for revolutions of said tangent and driven by said shaft, said indicator lying in a vertical plane, there being lost motion between said indicator and said worm, a stationary marker adjacent to the calibrations on said indicator, with means for passing a definite amount of gas through said meter.

7. The combination in a meter having a tangent, of a worm having a vertical axis, a gear actuated thereby, the axis of said gear lying in a horizontal plane, a shaft connected to said gear, an indicator having a graduated sector calibrated for revolutions of said tangent and driven by said shaft, said indicator lying in a vertical plane, there being lost motion between said indicator and said worm, a stationary marker adjacent to the calibrations on said indicator, with means for passing a definite amount of gas through said meter, said means consisting of a connection having an automatic pressure regulating valve and a standardized burner.

8. The combination in a meter having a tangent, of a worm having a vertical axis, a gear actuated thereby, the axis of said gear lying in a horizontal plane, a shaft connected to said gear, an indicator having a graduated sector calibrated for revolutions of said tangent and driven by said shaft, said indicator lying in a vertical plane, there being lost motion between said indicator and said worm, a stationary marker adjacent to the calibrations on said indicator, with means for passing a definite amount of gas through said meter, said means consisting of a standardized burner and means for controlling the pressure of the gas applied thereto.

RICHARD LEE DEZENDORF.

Copies of this patent may be obtained for five cents each, by addressing the "Commissioner of Patents, Washington, D C."